(12) United States Patent
Hou

(10) Patent No.: US 11,860,718 B2
(45) Date of Patent: Jan. 2, 2024

(54) REGISTER READING METHOD AND APPARATUS, DEVICE, AND MEDIUM

(71) Applicant: INSPUR SUZHOU INTELLIGENT TECHNOLOGY CO., LTD., Jiangsu (CN)

(72) Inventor: Zhili Hou, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/036,603

(22) PCT Filed: Nov. 30, 2021

(86) PCT No.: PCT/CN2021/134433
§ 371 (c)(1),
(2) Date: May 11, 2023

(87) PCT Pub. No.: WO2022/267349
PCT Pub. Date: Dec. 29, 2022

(65) Prior Publication Data
US 2023/0393924 A1    Dec. 7, 2023

(30) Foreign Application Priority Data
Jun. 22, 2021 (CN) .......................... 202110691287.7

(51) Int. Cl.
*G06F 11/00* (2006.01)
*G06F 11/07* (2006.01)
(52) U.S. Cl.
CPC ...... *G06F 11/0778* (2013.01); *G06F 11/0787* (2013.01)

(58) Field of Classification Search
None
See application file for complete search history.

(56) References Cited

U.S. PATENT DOCUMENTS 10,474,518 B1 * 11/2019 Rupavatharam ...... G06F 11/366
11,360,839 B1 *  6/2022 Hsiao .................. G06F 13/4282
(Continued)

FOREIGN PATENT DOCUMENTS

| CN | 109189602 A | 1/2019 |
| CN | 109542752 A | 3/2019 |

(Continued)

OTHER PUBLICATIONS

Google Scholar/Patents search—text refined (Year: 2023).*
(Continued)

*Primary Examiner* — Christopher S McCarthy
(74) *Attorney, Agent, or Firm* — IPro, PLLC

(57) ABSTRACT

A register reading method and apparatus, a device and a medium. After a server is crashed, a CPU-register collecting request is triggered. Different types of CPUs correspond to different types and quantities of registers that require data collection. Therefore, by firstly determining the register required to be read corresponding to the CPU type, and determining the reading mode of the register, the disadvantage that the reading mode that may merely use a single instruction may not satisfy the demand on field crashing analysis is prevented. Subsequently, by using a PECI bus, the register data of a plurality of registers are read. By collecting the registers of the CPU directly by using the PECI bus, the problem that the performance excessively relies on the stability of the ME due to the intermediate transfer via the ME is prevented, which greatly increases the reading success rate of the registers.

20 Claims, 4 Drawing Sheets

(56) References Cited

U.S. PATENT DOCUMENTS

| | | | | |
|---|---|---|---|---|
| 2008/0270827 A1* | 10/2008 | Brandyberry | ....... | G06F 11/0778 714/11 |
| 2016/0099886 A1 | 4/2016 | Rao et al. | | |
| 2019/0042348 A1* | 2/2019 | Krithivas | ............ | G06F 11/0784 |

FOREIGN PATENT DOCUMENTS

| | | |
|---|---|---|
| CN | 109614259 A | 4/2019 |
| CN | 109783262 A | 5/2019 |
| CN | 109947596 A | 6/2019 |
| CN | 110362435 A | 10/2019 |
| CN | 110515802 A | 11/2019 |
| CN | 111048139 A | 4/2020 |
| CN | 111538679 A | 8/2020 |
| CN | 111767184 A | 10/2020 |
| CN | 113253941 A | 8/2021 |

OTHER PUBLICATIONS

Ying-dan Li. "A batch reading method for the signal values of the similar named ports in the register transmission stage design." China Integrated Circuit. 53-55. Jul. 2015.

\* cited by examiner

REGISTER READING METHOD AND APPARATUS, DEVICE, AND MEDIUM

The present application claims the priority of the Chinese patent application filed on Jun. 22, 2021 before the Chinese Patent Office with the application number of 202110691287.7 and the title of "REGISTER READING METHOD AND APPARATUS, DEVICE, AND MEDIUM", which is incorporated herein in its entirety by reference.

FIELD

The present application relates to the technical field of register reading, and particularly relates to a register reading method and apparatus, a device and a medium.

BACKGROUND

Various types of external devices of servers are used, and the manufacturers and the specifications are not completely unified. Moreover, for reasons such as device aging and equipment failure, some failures of the devices such as the PCIE (Peripheral Component Interconnect Express), the internal memory or the CPU (Central Processing Unit) result in situations that seriously affect the normal service running, such as crashing.

The source of the data used by the BMC (Baseboard Management Controller) for the fault diagnosis are the data of various registers acquired by the PECI (Platform Environment Control Interface) from the CPU of the server, and, subsequently, according to a certain rule, the function of fault location and diagnosis is realized. Such a technique includes, by the BMC, via the interaction with the ME, sending a RAWPECI command, to realize the acquirement of the data of the CPU registers. The ME is added between the BMC and the CPU. When a crashing failure happens, in response to the ME not operating normally, the BMC has absolutely no approach to acquire any data of the CPU registers.

In order to solve the above problem, in the related art, the BMC interacts with the PECI bus directly connected to the CPU, and acquires the data of the CPU registers by using the single-instruction mode. Such a mode prevents the relying on the stability of the ME. However, because for different CPU types, different reading modes are employed, the data of MSR (Model Specific Registers) or CSR (Control and Status Register) that are acquired by simply relying on the single instruction are limited. Furthermore, crashing events with different causes result in the problem that the data cannot be read by using the single instruction.

SUMMARY

A purpose of the present application is to provide a register reading method and apparatus, a device and a medium, which may increase the success rate of register reading. The solutions are as follows:

the present application provides a register reading method, and the method includes:
after a server is crashed, by a BMC, receiving a CPU-register collecting request;
according to the CPU-register collecting request, determining a plurality of registers corresponding to a CPU type;
according to a predetermined condition, determining a register-reading mode; and
according to the register-reading mode, by using a PECI bus, reading register data of the plurality of registers.

In some embodiments of the present application, the operation of, according to the register-reading mode, by using the PECI bus, reading the register data of the plurality of registers includes:
placing the plurality of registers into a to-be-read queue;
reading one of the registers from the to-be-read queue, and according to the register-reading mode, by using the PECI bus, reading to-be-read register data of the register;
when the reading fails, placing the register into a queue tail of a failing-polling region;
when the reading succeeds, in response to the to-be-read queue being not empty, reading a next register in the to-be-read queue, or, in response to the to-be-read queue being empty, reading the register in the failing-polling region, and when the reading of the register in the failing-polling region fails, placing the register whose reading fails in the failing-polling region into the queue tail of the failing-polling region; and
when the predetermined condition is reached, stopping the operation of the reading of the registers.

In some embodiments of the present application, the method further includes:
setting a preset duration of a timer; and
when any one of conditions that a reading duration reaches the preset duration, that all of the registers are completely read and that a time quantity of the reading of the register in the failing-polling region reaches a corresponding preset time quantity is satisfied, stopping reading the register data.

In some embodiments of the present application, the method further includes:
according to importances of the registers in fault diagnosis, determining reading priorities of the plurality of registers, wherein the importances refer to importances of action scopes in a fault-diagnosis logic, application frequencies and application diagnosis logic branches in the whole fault-diagnosis logic of the registers; and
according to the priorities of the registers, determining the time quantity of the reading of the register in the failing-polling region, wherein a reading time quantity of a register of a higher priority is not lower than a reading time quantity of a register of a lower priority.

In some embodiments of the present application, before the operation of, according to the register-reading mode, by using the PECI bus, reading the register data of the plurality of registers, the method further includes:
determining whether a previous CPU-register collecting request is completed; and
when the previous CPU-register collecting request is completed, executing the operation of, according to the register-reading mode, by using the PECI bus, reading the register data of the plurality of registers.

In some embodiments of the present application, the method further includes:
counting up a quantity of successful reading and a quantity of failing reading of the plurality of registers, and recording a configuration situation of the server.

In some embodiments of the present application, the operation of, according to the predetermined condition, determining the register-reading mode includes:
according to the CPU type, determining the register-reading mode; or according to the reading success rates of the different reading modes, determining the register-reading mode; or according to mapping relations between the crashing scenes and the reading modes and the reading success rates, determining the register-reading mode.

The present application provides a register reading apparatus, wherein the apparatus includes:

a request receiving module configured for, after a server is crashed, by a BMC, receiving a CPU-register collecting request;

a register determining module configured for, according to the CPU-register collecting request, determining a plurality of registers corresponding to a CPU type;

a register-reading-mode determining module configured for, according to a predetermined condition, determining a register-reading mode; and a reading module configured for, according to the register-reading mode, by using a PECI bus, reading register data of the plurality of registers.

The present application provides an electronic device, wherein the electronic device includes:

a memory configured for storing a computer program; and a processor configured for, when executing the computer program, implementing the operations of the register reading method stated above.

The present application provides a computer-readable storage medium, wherein the computer-readable storage medium stores a computer program, and the computer program, when executed by a processor, implements the operations of the register reading method stated above.

The present application provides a register reading method, wherein the method includes: after a server is crashed, by a BMC, receiving a CPU-register collecting request; according to the CPU-register collecting request, determining a plurality of registers corresponding to a CPU type; according to a predetermined condition, determining a register-reading mode; and according to the register-reading mode, by using a PECI bus, reading register data of the plurality of registers.

It can be seen that, in the present application, after a server is crashed, a CPU-register collecting request is triggered. Different types of CPUs correspond to different types and quantities of registers that require data collection. Therefore, by firstly determining the register required to be read corresponding to the CPU type, and determining the reading mode of the register, the disadvantage that the reading mode that can merely use a single instruction cannot satisfy the demand on field crashing analysis is prevented. Subsequently, by using a PECI bus, the register data of a plurality of registers are read. By collecting the registers of the CPU directly by using the PECI bus, the problem that the performance excessively relies on the stability of the ME due to the intermediate transfer via the ME is prevented, which greatly increases the reading success rate of the registers.

The present application further provides a register reading apparatus, an electronic device and a medium, all of which have the above-described advantageous effects, which is not discussed further herein.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are merely embodiments of the present application, and a person skilled in the art may obtain other figures according to the provided figures without paying creative work.

DETAILED DESCRIPTION

In order to make the objects, the technical solutions and the advantages of the embodiments of the present application clearer, the technical solutions according to the embodiments of the present application will be clearly and completely described below with reference to the drawings according to the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the related art, the BMC interacts with the PECI bus directly connected to the CPU, and acquires the data of the CPU registers by using the single-instruction mode. Such a mode prevents the relying on the stability of the ME. However, because for different CPU types, different reading modes are employed, the data of MSR or CSR registers that are acquired by simply relying on the single instruction are limited. Furthermore, crashing events with different causes result in the problem that the data cannot be read by using the single instruction.

Figure 1:
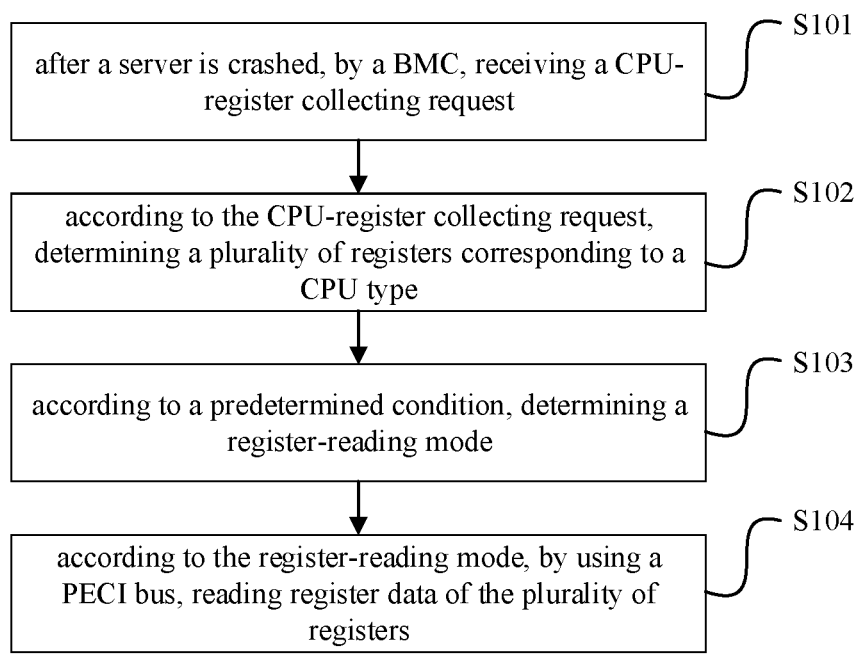
FIG. 1 is a flow chart of a register reading method according to an embodiment of the present application.

In view of the above technical problems, the present embodiment provides a register reading method. After a server is crashed, a CPU-register collecting request is triggered. Different types of CPUs correspond to different types and quantities of registers that require data collection. Therefore, by firstly determining the register required to be read corresponding to the CPU type, and determining the reading mode of the register, the disadvantage that the reading mode that can merely use a single instruction cannot satisfy the demand on field crashing analysis is prevented. Subsequently, by using a PECI bus, the register data of a plurality of registers are read. By collecting the registers of the CPU directly by using the PECI bus, the problem that the performance excessively relies on the stability of the ME due to the intermediate transfer via the ME is prevented, which greatly increases the reading success rate of the registers. In some embodiments, referring to FIG. 1, FIG. 1 is a flow chart of a register reading method according to an embodiment of the present application. The method includes:

S101: after a server is crashed, by a BMC, receiving a CPU-register collecting request.

The present application mainly aims at the reading of the data in the registers after the server is crashed. After the server is crashed, a CPU-register collecting request for a BMC to collect the register data of a CPU is triggered. The CPU-register collecting request includes the CPU type and the request information.

S102: according to the CPU-register collecting request, determining a plurality of registers corresponding to a CPU type.

Different types of CPUs correspond to different types and quantities of registers that require data collection, and include cores of different quantities. Therefore, it is required to determine, according to the type of the used CPU detected by the BIOS (Basic Input Output System), which CSR/MSR registers are required to be read. Therefore, firstly, the registers required to be read corresponding to the CPU type are determined.

S103: according to a predetermined condition, determining a register-reading mode.

The predetermined condition is not limited in the present embodiment, and may be selected according to demands.

In some embodiments of the present application, the operation of, according to the predetermined condition, determining the register-reading mode includes:

according to the CPU type, determining the register-reading mode; or according to the reading success rates of the different reading modes, determining the register-reading mode; or according to mapping relations between the crashing scenes and the reading modes and the reading success rates, determining the register-reading mode.

The register-reading mode by which the PECI reads the CPU registers may be the register-reading mode determined according to the CPU type; in other words, the reading is according to a predetermined reading mode. The predetermined reading mode includes a single-instruction mode, a sequence-instruction-sequence mode and a crash mode, which may be configured by the user or according to the different CPU types when leaving factory. The configuring may be performed by using an external IPMI command, and the configuration is written into an EEPROM (Electrically Erasable Programmable Read-Only Memory) chip on the mainboard, and does not vary with the updating of the firmware of the BMC.

The register-reading mode may also be determined according to the reading success rates of the different reading modes. According to the success rates of the register reading of the different reading modes and the field diagnosis situation, any one of the single-instruction reading mode, the sequence reading mode and the crash reading mode is employed, which may be configured by the user by using the IPMI command. The selection based on the statistical empirical types may greatly prevent reading failure.

Certainly, the register-reading mode is also configurable to be automatically selected, and when the register-reading mode is configured to be automatically selected, the BMC counts up relations of crashing scenes with the register-reading modes and reading success rates of the crashing scenes, and selects, from the three register-reading modes, one register-reading mode that has a highest success rate for a current crashing scene and a current register for the reading. In some embodiments, such a mode is a mode of the automatic learning of the BMC. The field servers have various types of failures or crashes, and the failures or crashes happen multiple times. When a crash happens, the BMC reads by using all of the 3 modes, and subsequently selects the registers that are read by using the mode having the highest reading success rate for the analysis, to locate the failure cause. At this point, there is a correspondence relation between the failure cause, the reading mode and the reading success rate. After failures or crashes happen multiple times, there are many data of such correspondence relations. At this point, the BMC counts up, with respect to the server where it is located, which of the reading modes has the highest success rate, and when a failure happens again, it uses that reading mode. When, at a certain time, the register failure location that is read by using that reading mode fails, it re-learns, to select an optimum reading mode from the 3 types (the single-instruction reading mode, the sequence reading mode and the crash reading mode).

In this operation, by according to the predetermined condition, determining the register-reading mode, the disadvantage that the reading mode that can merely use a single instruction cannot satisfy the demand on field crashing analysis is prevented.

S104: according to the register-reading mode, by using a PECI bus, reading register data of the plurality of registers.

By, according to the determined register-reading mode, by using the PECI bus, reading the register data, the problem that the performance excessively relies on the stability of the ME due to the intermediate transfer via the ME is prevented.

On the basis of the above technical solution, in the present embodiment, after a server is crashed, a CPU-register collecting request is triggered. Different types of CPUs correspond to different types and quantities of registers that require data collection. Therefore, by firstly determining the register required to be read corresponding to the CPU type, and determining the reading mode of the register, the disadvantage that the reading mode that can merely use a single instruction cannot satisfy the demand on field crashing analysis is prevented. Subsequently, by using a PECI bus, the register data of a plurality of registers are read. By collecting the registers of the CPU directly by using the PECI bus, the problem that the performance excessively relies on the stability of the ME due to the intermediate transfer via the ME is prevented, which greatly increases the reading success rate of the registers.

In some embodiments of the present application, the register reading method further includes:

setting a preset duration of a timer; and when the preset duration is reached, stopping reading the register data.

In the present embodiment, the preset duration is set in the timer, which is mainly for the following reasons. Firstly, after the server is crashed, the BIOS maintains the crashing state of the server by using a certain mechanism. However, there is a time limit, and when the time limit is exceeded, the server automatically restarts. After the restarting, the data of the CPU registers are automatically reset, and the register data that the BMC subsequently collects are useless for the analysis. Secondly, when the BMC is collecting the register data, and the data cannot be collected, there is a retry mechanism, which also requires a time limit, and the retry cannot be performed infinitely.

It can be seen that, in the present embodiment, by using the preset duration to prevent the reading of invalid register data, the efficiency of the reading is increased.

Figure 6:
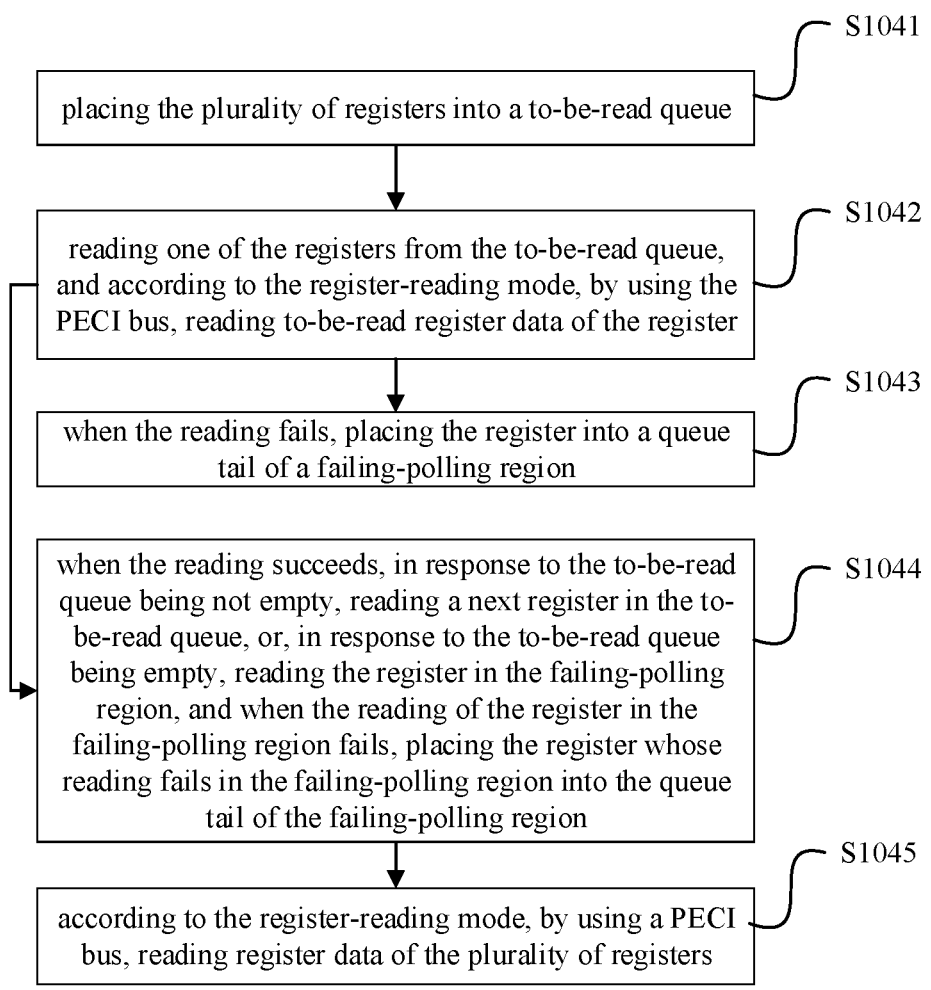
FIG. 6 is a schematic flow chart of the reading of a registering region according to an embodiment of the present application.

Further, by providing the to-be-read queue and the failing-polling region, and polling the to-be-read registers, it is ensured to the greatest extent that each of the to-be-read registers may be read one time, and the to-be-read registering region of the failing-polling region is read again, which increases the success rate of the reading. Referring to FIG. 6, FIG. 6 is a schematic flow chart of the reading of a registering region according to an embodiment of the present application. The flow includes:

S1041: placing the plurality of registers into a to-be-read queue.

Based on the model and the core quantity of the CPU, whether a hyper-threading is turned on, and the types and the quantities of the supported registers in the configuration of the server detected by the BIOS, it is determined which CSR/MSR registers are required to be read, and those registers are placed into the to-be-read queue. The quantity of the registers is not limited in the present embodiment, and may be determined according to practical situations by the user.

S1042: reading one of the registers from the to-be-read queue, and according to the register-reading mode, by using the PECI bus, reading to-be-read register data of the register.

One of the to-be-read registers is read from the to-be-read queue in sequence, and the to-be-read register data are read in the determined register-reading mode.

S1043: when the reading fails, placing the register into a queue tail of a failing-polling region.

The failing-polling region includes all of the to-be-read registers whose reading fails, which are arranged in the sequence of the times of the reading failures. They are placed into the queue tail after the reading fails.

In this operation, the main reason why the to-be-read registers whose reading fails are placed into the failing-polling region is the setting of the preset duration. In case that one to-be-read register is always read without limitation, within the duration the other to-be-read registers, which may be read, do not have the chance of being read.

S1044: when the reading succeeds, in response to the to-be-read queue being not empty, reading a next register in the to-be-read queue, or, in response to the to-be-read queue being empty, reading the register in the failing-polling region, and when the reading of the register in the failing-polling region fails, placing the register whose reading fails in the failing-polling region into the queue tail of the failing-polling region.

When the reading succeeds, the next to-be-read register in the to-be-read queue is read, till the to-be-read queue is empty. At this point, the failing to-be-read registers in the failing-polling region are read. At this point, they are also read in sequence, and when the reading of the register in the failing-polling region fails, the register whose reading fails in the failing-polling region is placed into the queue tail of the failing-polling region.

In this operation, merely when the to-be-read registers are empty, the failing to-be-read registers in the failing-polling region are read, which is mainly in order to ensure that all of the to-be-read registers are read one time, and subsequently the failing to-be-read registers are emphatically read.

S1045: when the predetermined condition is reached, stopping the operation of the reading of the registers.

In this operation, after the predetermined condition is reached, the reading of the invalid data is prevented, which increases the accuracy of the reading.

The predetermined condition is not limited in the present embodiment, and may be set according to practical demands by the user, as long as the purpose of the present embodiment may be realized. In some embodiments, when the reading duration reaches the preset duration, the reading is stopped, or simultaneously when all of the registers are read completely, the reading succeeds. In some embodiments, when the maximum value of the time quantity of the register reading exceeds a preset time quantity, the reading is stopped.

On the basis of the above technical solution, in the present embodiment, by providing the to-be-read queue and the failing-polling region, and polling the to-be-read registers, it is ensured to the greatest extent that each of the to-be-read registers may be read one time, and the to-be-read registering region of the failing-polling region is read again, which increases the success rate of the reading.

In some embodiments of the present application, in order to prevent the reading of the invalid data, to increase the accuracy of the reading, the register reading method further includes:

setting a preset duration of a timer; and
when any one of conditions that a reading duration reaches the preset duration, that all of the registers are completely read and that a time quantity of the reading of the register in the failing-polling region reaches a corresponding preset time quantity is satisfied, stopping reading the register data.

In some embodiments, when any one of the sub-condition A that the reading duration reaches the preset duration, the sub-condition B that all of the registers are completely read and the sub-condition C that the time quantity of the reading of the register in the failing-polling region reaches a corresponding preset time quantity is satisfied, stopping reading the register data. That all of the registers are completely read refers to that all of the registers are successfully read. The preset time quantity of the registers in the failing-polling region may be set according to practical demands, which may be that each of the registers corresponds to one preset time quantity, and may also be that the target registers correspond to a preset time quantity.

On the basis of the above technical solution, in the present embodiment, when any one of conditions that a reading duration reaches the preset duration, that all of the registers are completely read and that a time quantity of the reading of the register in the failing-polling region reaches a corresponding preset time quantity is satisfied, the reading of the register data is stopped, which may prevent the reading of the invalid data, which increases the accuracy of the reading.

In some embodiments of the present application, the register reading method further includes:

according to importances of the registers in fault diagnosis, determining reading priorities of the plurality of registers, wherein the importances refer to importances of action scopes in a fault-diagnosis logic, application frequencies and application diagnosis logic branches in the whole fault-diagnosis logic of the registers; and
according to the priorities of the registers, determining the time quantity of the reading of the register in the failing-polling region, wherein a reading time quantity of a register of a higher priority is not lower than a reading time quantity of a register of a lower priority.

In the present embodiment, according to importances of the registers in fault diagnosis, the reading priorities of the registers are determined. Classification and priority division are performed to the CSR and MSR registers, and the priorities of the CSR and MSR registers are determined according to their importances of action scopes in a fault-diagnosis logic, application frequencies and application diagnosis logic branches in the whole fault-diagnosis logic. In some embodiments, the priorities of the registers are classified into high-priority reading, medium-priority reading and low-priority reading. The definition of the priorities is limited to the second stage of the reading of the registers by the PECI (the register reading in the failing-polling region), i.e., for the stage of reading retry of the registers whose reading for the first time fails, and it is prescribed that each time of the reading with the high priority may be retried a first time quantity, each time of the reading with the medium priority may be retried a second time quantity, and each time of the reading with the low priority may be retried a third time quantity, among them, the first time quantity≥the second time quantity≥the third time quantity, and the third time quantity>0. By setting the different weights of the retry of the reading of the registers of the different priorities, it is ensured that the reading success rate of the registers of the high priority is increased, thereby providing high-quality register analysis data for the whole fault-diagnosis logic.

In some embodiments of the present application, the register reading method further includes:
  determining whether a previous CPU-register collecting request is completed; and
  when the previous CPU-register collecting request is completed, executing the operation of, according to the register-reading mode, by using the PECI bus, reading the register data of the plurality of registers.

In the present embodiment, after the previous one CPU-register collecting request is completed, the step S104 is executed. When it is not completed, then firstly the previous one CPU-register collecting request is completed, and after it is completed, subsequently the step S104 is executed. With ensures that the previous one CPU-register collecting request completely collects the data.

In some embodiments of the present application, the method further includes:
  counting up a quantity of successful reading and a quantity of failing reading of the plurality of registers, and recording a configuration situation of the server.

In the present embodiment, the counted-up quantity of the successful reading is the final quantity of the successful reading, and the current configuration situation of the server is recorded, to facilitate the technician to view.

In some embodiments of the present application, the method further includes:
  by using the level information of a CPU pin, determining whether the server is crashed.

After the server is crashed, it notifies the BMC via a special pin of the CPU. When the BMC detects that the magnitude of the level of the pin changes, that indicates that a crashing event happens, and it is required to collect the corresponding CPU registers and perform fault diagnosis and location with a certain rule.

Figure 2:
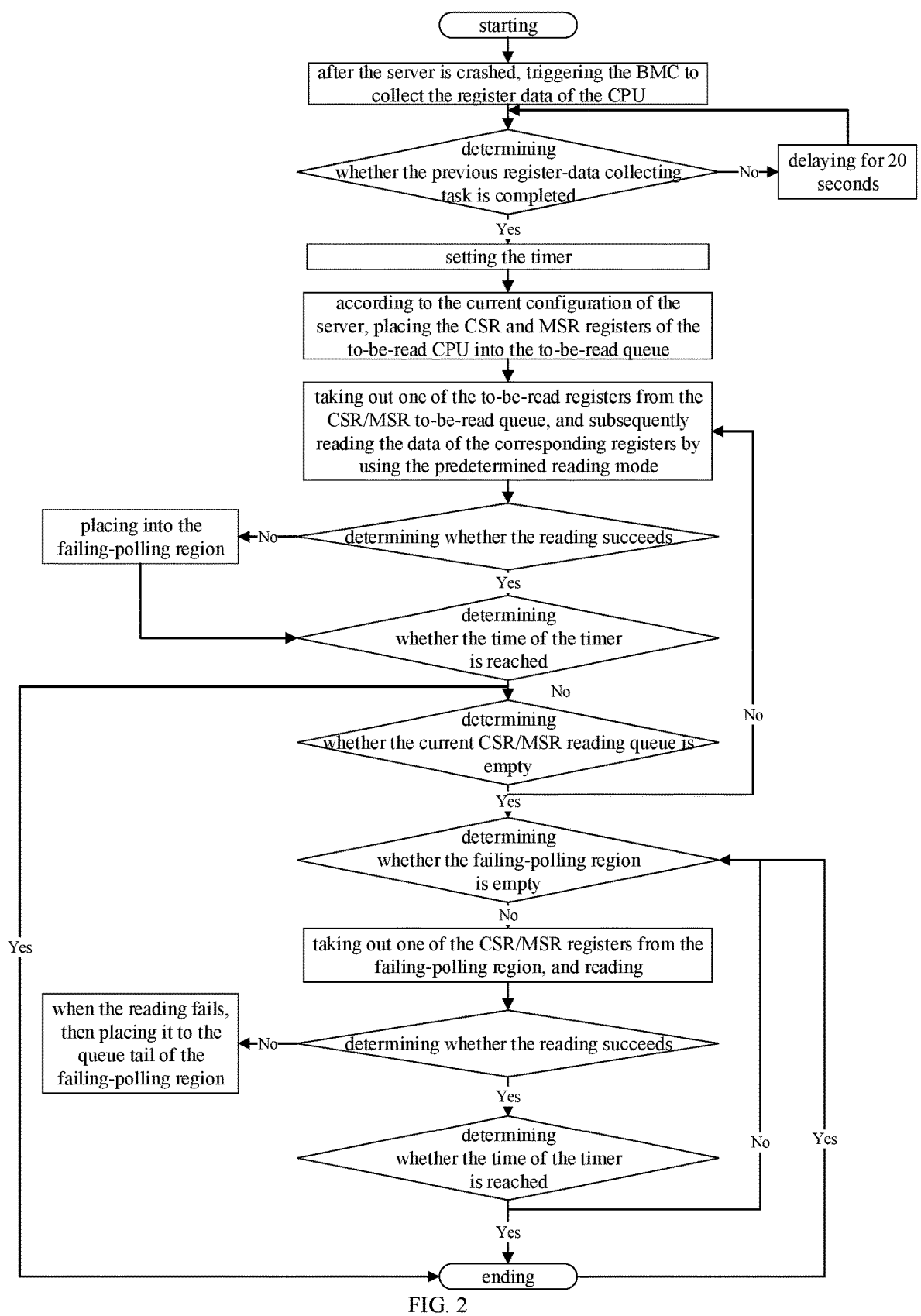
FIG. 2 is a schematic flow chart of a particular register reading according to an embodiment of the present application.

On the basis of any one of the above embodiments, the present embodiment provides the process of a particular method for increasing the reading success rate of the CPU of the server by using the PECI. In some embodiments, referring to FIG. 2, FIG. 2 is a schematic flow chart of a particular register reading according to an embodiment of the present application. The flow includes:
  S1: after the server is crashed, triggering the BMC to collect the register data of the CPU.
  S2: determining whether the previous register-data collecting task is completed; and
  when it is completed, then turning to the step S3, and when it is not completed, then waiting for 2 s, and subsequently repeating the step S2.
  S3: setting the timer; and
  setting the preset duration of the timer to be 180 s (that duration is the total duration of the whole process of the collection of the CPU registers by the BMC, when, in the collection of the CPU registers, it is detected that the time is reached, then the collection by the PECI is directly exited, and, in addition, the value of that duration may be flexibly set according to demands by commands according to the configurations and the application scenes of the field server).
  S4: according to the current configuration of the server, placing the CSR and MSR registers of the to-be-read CPU into the to-be-read queue.
  S5: taking out one of the to-be-read registers from the CSR/MSR to-be-read queue, and subsequently reading the data of the corresponding registers by using the predetermined reading mode.

The predetermined reading mode includes the single-instruction reading mode, the sequence reading mode and the crash reading mode, which may be configured by commands according to the field environment and scene, and may also be configured as auto. When it is configured as auto, the BMC counts up the relations of the crashing scenes with the reading modes and the success rates of the crashing scenes, and selects from the three reading modes one mode that has the highest success rate for the reading.
  S6: determining whether the reading succeeds; and
  when the reading fails, then placing the corresponding register into the failing-polling region, and when the reading succeeds, then turning to the step S7.
  S7: determining whether the time of the timer is reached; and
  when it is reached, then terminating the reading process of the PECI, and when it is not reached, then turning to the step S8.
  S8: determining whether the current CSR/MSR reading queue is empty, when it is empty then turning to the step S9, and when it is not empty, then taking out one of the registers therefrom, and repeating the steps S5-S8.
  S9: determining whether the failing-polling region is empty; and when it is empty, then terminating the collecting process of the CPU registers.
  S10: when it is not empty, then taking out one of the CSR/MSR registers from the failing-polling region, and reading.
  S11: when the reading fails, then placing it to the queue tail of the failing-polling region.
  S12: determining whether the time of the timer is reached; and
  when the time is reached, then exiting the process of the register reading by the PECI, and when the time is not reached, then repeating the steps S9-S11.
  S13: counting up the quantity of the registers that are successfully read currently, the quantity of the registers whose reading fails, and the current configuration situation of the server, and recording into the log.

It can be seen that the present embodiment is not limited to one PECI reading mode, wherein the present embodiment may include, according to the setting, selecting to read the registers of the CPU by using the single-instruction mode, the sequence mode or the crash mode, and may also include, according to the reading success rates of the modes of the BMC in the previous stage, adaptively learning the PECI reading mode that is most suitable for the failure. The present embodiment further provides a timer mechanism, in which the numerical value of the timer may be set according to the actual application scene of the user, and the timer is used to overall control the execution duration of the whole process. Moreover, by firstly polling one time to read the CSR/MSR registers one time, and subsequently polling according to the duration of the timer, it is ensured that each of the registers may be read at least one time.

Figure 3:
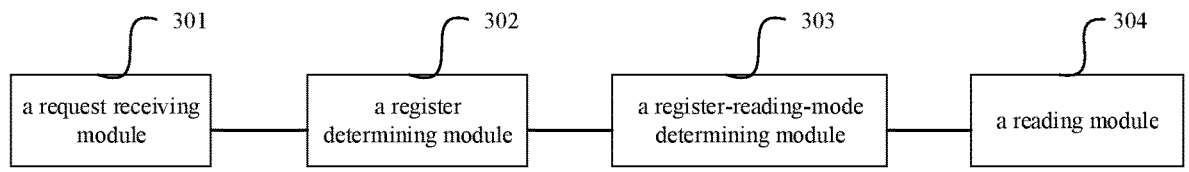
FIG. 3 is a schematic structural diagram of a register reading apparatus according to an embodiment of the present application.

A register reading apparatus according to the embodiments of the present application will be described below, and the apparatus described below and the method described above may correspondingly refer to each other. Referring to FIG. 3, FIG. 3 is a schematic structural diagram of a register reading apparatus according to an embodiment of the present application. The apparatus includes:

- a request receiving module 301 configured for, after a server is crashed, by a BMC, receiving a CPU-register collecting request;
- a register determining module 302 configured for, according to the CPU-register collecting request, determining a plurality of registers corresponding to a CPU type;
- a register-reading-mode determining module 303 configured for, according to a predetermined condition, determining a register-reading mode; and
- a reading module 304 configured for, according to the register-reading mode, by using a PECI bus, reading register data of the plurality of registers.

In some embodiments of the present application, the register-reading-mode determining module 303 includes:

- a to-be-read-queue placing-into unit configured for placing the plurality of registers into a to-be-read queue;
- a first reading unit configured for reading one of the registers from the to-be-read queue, and according to the register-reading mode, by using the PECI bus, reading to-be-read register data of the register;
- a polling-failing-region placing-into unit configured for, when the reading fails, placing the register into a queue tail of a failing-polling region;
- a second reading unit configured for, when the reading succeeds, in response to the to-be-read queue being not empty, reading a next register in the to-be-read queue, or, in response to the to-be-read queue being empty, reading the register in the failing-polling region, and when the reading of the register in the failing-polling region fails, placing the register whose reading fails in the failing-polling region into the queue tail of the failing-polling region; and
- a stopping unit configured for, when the predetermined condition is reached, stopping the operation of the reading of the registers.

In some embodiments of the present application, the apparatus further includes:

- a duration setting module configured for setting a preset duration of a timer; and
- correspondingly, the stopping unit is configured for, when any one of conditions that a reading duration reaches the preset duration, that all of the registers are completely read and that a time quantity of the reading of the register in the failing-polling region reaches a corresponding preset time quantity is satisfied, stopping reading the register data.

In some embodiments of the present application, the apparatus further includes:

- a priority determining module configured for, according to importances of the registers in fault diagnosis, determining reading priorities of the plurality of registers, wherein the importances refer to importances of action scopes in a fault-diagnosis logic, application frequencies and application diagnosis logic branches in the whole fault-diagnosis logic of the registers; and
- a priority-time-quantity determining module configured for, according to the priorities of the registers, determining the time quantity of the reading of the register in the failing-polling region, wherein a reading time quantity of a register of a higher priority is not lower than a reading time quantity of a register of a lower priority.

In some embodiments of the present application, the register-reading-mode determining module 303 further includes:

- a determining unit configured for determining whether a previous CPU-register collecting request is completed; and
- an executing unit configured for, when the previous CPU-register collecting request is completed, executing the operation of, according to the register-reading mode, by using the PECI bus, reading the register data of the plurality of registers.

In some embodiments of the present application, the apparatus further includes:

- a counting-up and recording module configured for counting up a quantity of successful reading and a quantity of failing reading of the plurality of registers, and recording a configuration situation of the server.

In some embodiments of the present application, the register-reading-mode determining module 303 is configured for:

- according to the CPU type, determining the register-reading mode; or
- according to the reading success rates of the different reading modes, determining the register-reading mode; or
- according to mapping relations between the crashing scenes and the reading modes and the reading success rates, determining the register-reading mode.

Because the embodiments of the apparatus and the embodiments of the method correspond to each other, the embodiments of the apparatus may refer to the description on the embodiments of the method, and are not discussed further herein.

Figure 4:
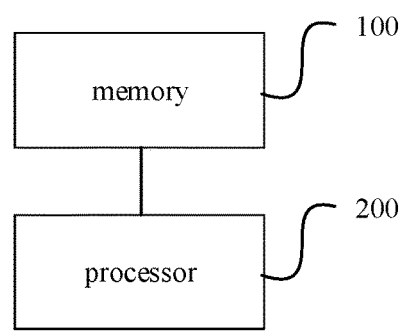
FIG. 4 is a schematic structural diagram of an electronic device according to an embodiment of the present application.

An electronic device according to the embodiments of the present application will be described below, and the electronic device described below and the method described above may correspondingly refer to each other. Referring to FIG. 4, FIG. 4 is a schematic structural diagram of an electronic device according to an embodiment of the present application. The electronic device includes:

- a memory 100 configured for storing a computer program; and
- a processor 200 configured for, when executing the computer program, implementing the operations of the method stated above.

The memory 100 includes a non-volatile storage medium and an internal memory. The non-volatile storage medium stores an operating system and a computer-readable instruction. The internal memory provides the environment for the running of the operating system and the computer-readable instruction in the non-volatile storage medium. The processor 200 provides the capacities of calculating and controlling to the electronic device, and, when executing the computer program stored in the memory 100, may implement the following operations:

- after the server is crashed, by a BMC, receiving a CPU-register collecting request;
- according to the CPU-register collecting request, determining a plurality of registers corresponding to a CPU type; according to a predetermined condition, determining a register-reading mode; and
- according to the register-reading mode, by using a PECI bus, reading register data of the plurality of registers.

It can be seen that, in the present application, after the server is crashed, a CPU-register collecting request is triggered. Different types of CPUs correspond to different types and quantities of registers that require data collection. Therefore, by firstly determining the register required to be read corresponding to the CPU type, and determining the reading mode of the register, the disadvantage that the reading mode that can merely use a single instruction cannot satisfy the demand on field crashing analysis is prevented. Subsequently, by using a PECI bus, the register data of a plurality of registers are read. By collecting the registers of the CPU directly by using the PECI bus, the problem that the performance excessively relies on the stability of the ME due to the intermediate transfer via the ME is prevented, which greatly increases the reading success rate of the registers.

In some embodiments, the processor 200, when executing a computer subprogram stored in the memory 100, may implement the following operations:

placing the plurality of registers into a to-be-read queue;

reading one of the registers from the to-be-read queue, and according to the register-reading mode, by using the PECI bus, reading to-be-read register data of the register;

when the reading fails, placing the register into a queue tail of a failing-polling region;

when the reading succeeds, in response to the to-be-read queue being not empty, reading a next register in the to-be-read queue, or, in response to the to-be-read queue being empty, reading the register in the failing-polling region, and when the reading of the register in the failing-polling region fails, placing the register whose reading fails in the failing-polling region into the queue tail of the failing-polling region; and when the predetermined condition is reached, stopping the operation of the reading of the registers.

In some embodiments, the processor 200, when executing a computer subprogram stored in the memory 100, may implement the following operations:

setting a preset duration of a timer; and when any one of conditions that a reading duration reaches the preset duration, that all of the registers are completely read and that a time quantity of the reading of the register in the failing-polling region reaches a corresponding preset time quantity is satisfied, stopping reading the register data.

In some embodiments, the processor 200, when executing a computer subprogram stored in the memory 100, may implement the following operations:

according to importances of the registers in fault diagnosis, determining reading priorities of the plurality of registers, wherein the importances refer to importances of action scopes in a fault-diagnosis logic, application frequencies and application diagnosis logic branches in the whole fault-diagnosis logic of the registers; and according to the priorities of the registers, determining the time quantity of the reading of the register in the failing-polling region, wherein a reading time quantity of a register of a higher priority is not lower than a reading time quantity of a register of a lower priority.

In some embodiments, the processor 200, when executing a computer subprogram stored in the memory 100, may implement the following operations:

determining whether a previous CPU-register collecting request is completed; and when the previous CPU-register collecting request is completed, executing the operation of, according to the register-reading mode, by using the PECI bus, reading the register data of the plurality of registers.

In some embodiments, the processor 200, when executing a computer subprogram stored in the memory 100, may implement the following operations:

counting up a quantity of successful reading and a quantity of failing reading of the plurality of registers, and recording a configuration situation of the server.

In some embodiments, the processor 200, when executing a computer subprogram stored in the memory 100, may implement the following operations:

according to the CPU type, determining the register-reading mode; or according to the reading success rates of the different reading modes, determining the register-reading mode; or according to mapping relations between the crashing scenes and the reading modes and the reading success rates, determining the register-reading mode.

Figure 5:
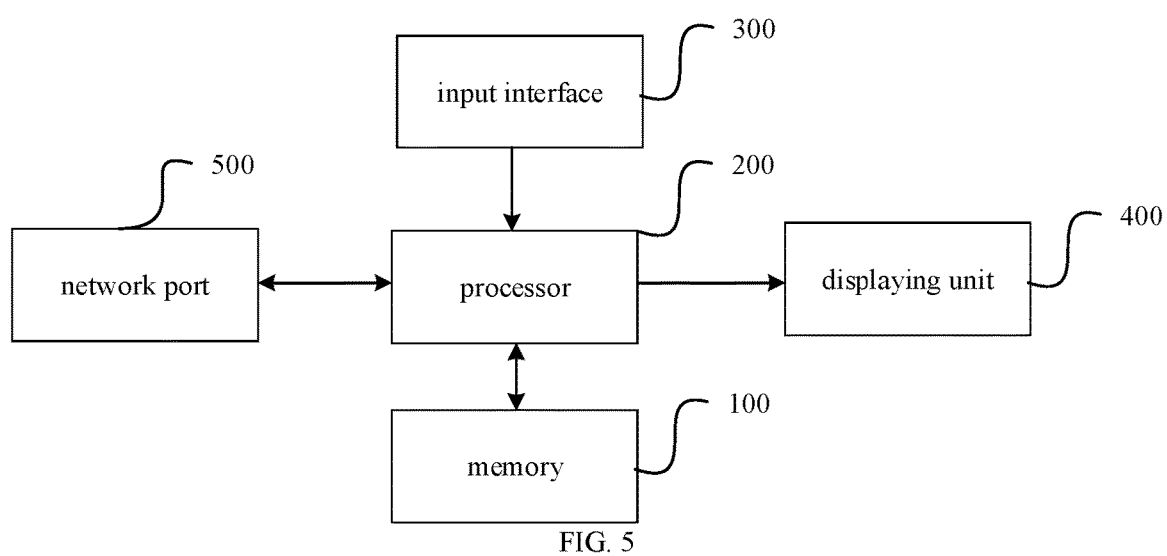
FIG. 5 is a structural diagram of another electronic device according to an embodiment of the present application.

On the basis of the above embodiments, as an embodiment, referring to FIG. 5, FIG. 5 is a structural diagram of another electronic device according to an embodiment of the present application. The electronic device further includes:

an input interface 300, connected to the processor 200, configured for acquiring computer programs, parameters and instructions imported externally, and, under the controlling by the processor 200, saving into the memory 100. The input interface 300 may be connected to an inputting device, and receive parameters or instructions inputted manually by the user. The inputting device may be a touch layer covering the display screen, may also be a key, a trackball or a touch-controlling board provided at the housing of a terminal, and may also be a keyboard, a touch-controlling board, a mouse and so on.

A displaying unit 400, connected to the processor 200, configured for displaying the data sent by the processor 200. The displaying unit 400 may be a display screen, a liquid-crystal display screen or an electronic-ink display screen in a PC (Personal Computer).

A network port 500, connected to the processor 200, configured for making communicative connection with external terminal devices. The communication technique employed by the communicative connection may be a wired-communication technique or a wireless-communication technique, such as Mobile High-Definition Link (MHL), Universal Serial Bus (USB), High-Definition Multimedia Interface (HDMI), Wireless Fidelity (WiFi), Bluetooth communication, low-power-consumption Bluetooth communication, and communication based on IEEE802.11s.

Because the embodiments of the electronic device and the embodiments of the method correspond to each other, the embodiments of the electronic device may refer to the description on the embodiments of the method, and are not discussed further herein.

A non-transitory computer-readable storage medium according to the embodiments of the present application will be described below, and the non-transitory computer-readable storage medium described below and the method described above may correspondingly refer to each other.

The present application discloses a non-transitory computer-readable storage medium, wherein the non-transitory computer-readable storage medium stores a computer program, and the computer program, when executed by a processor, implements the operations of the register reading method stated above.

Because the embodiments of the non-transitory computer-readable storage medium and the embodiments of the method correspond to each other, the embodiments of the non-transitory computer-readable storage medium may refer to the description on the embodiments of the method, and are not discussed further herein.

The embodiments of the description are described in the mode of progression, each of the embodiments emphatically describes the differences from the other embodiments, and the same or similar parts of the embodiments may refer to each other. Regarding the devices according to the embodiments, because they correspond to the methods according to the embodiments, they are described simply, and the relevant parts may refer to the description on the methods.

A person skilled in the art may further understand that the units and the algorithm steps of the examples described with reference to the embodiments disclosed herein may be implemented by using electronic hardware, computer software or a combination thereof. In order to clearly explain the interchangeability between the hardware and the software, the above description has described generally the configurations and the steps of the examples according to the functions. Whether those functions are executed by hardware or software depends on the particular applications and the design constraints of the technical solutions. A person skilled in the art may employ different methods to implement the described functions with respect to each of the particular applications, but the implementations should not be considered as extending beyond the scope of the present application.

The steps of the method or algorithm described with reference to the embodiments disclosed herein may be implemented directly by using hardware, a software module executed by a processor or a combination thereof. The software module may be embedded in a Random Access Memory (RAM), an internal memory, a read-only memory (ROM), an electrically programmable ROM, an electrically erasable programmable ROM, a register, a hard disk, a removable disk, a CD-ROM, or a storage medium in any other form well known in the art.

The register reading method and apparatus, the device and the medium according to the present application have been described in detail above. The principle and the embodiments of the present application are described herein with reference to the particular examples, and the description of the above embodiments is merely intended to facilitate to comprehend the method according to the present application and its core concept. It should be noted that a person skilled in the art may make improvements and modifications on the present application without departing from the principle of the present application, and all of the improvements and modifications fall within the protection scope of the claims of the present application.

The invention claimed is:

1. A register reading method, wherein the method comprises:
   after a server is crashed, by a BMC, receiving a CPU-register collecting request;
   according to the CPU-register collecting request, determining a plurality of registers corresponding to a CPU type;
   according to a predetermined condition, determining a register-reading mode, wherein the register-reading mode includes a single-instruction mode, a sequence-instruction-sequence mode and a crash mode, the register-reading mode is also configurable to be automatically selected, and when the register-reading mode is configured to be automatically selected, the BMC counts up relations of crashing scenes with the register-reading modes and reading success rates of the crashing scenes, and selects, from the three register-reading modes, one register-reading mode that has a highest success rate for a current crashing scene and a current register for reading; and
   according to the register-reading mode, by using a PECI bus, reading register data of the plurality of registers, comprising:
   placing the plurality of registers into a to-be-read queue;
   reading one of the registers from the to-be-read queue, and according to the register-reading mode, by using the PECI bus, reading to-be-read register data of the register;
   when the reading of one of the registers from the to-be-read queue fails, placing the register into a queue tail of a failing-polling region;
   when the reading of one of the registers from the to-be-read queue succeeds, in response to the to-be-read queue being not empty, reading a next register in the to-be-read queue, or, in response to the to-be-read queue being empty, reading the register in the failing-polling region, and when the reading of the register in the failing-polling region fails, placing the register whose reading fails in the failing-polling region into the queue tail of the failing-polling region; and
   when the predetermined condition is reached, stopping the operation of the reading of the registers.

2. The register reading method according to claim 1, wherein the method further comprises:
   setting a preset duration of a timer; and
   when any one of conditions that a reading duration reaches the preset duration, that all of the registers are completely read and that a time quantity of the reading of the register in the failing-polling region reaches a corresponding preset time quantity is satisfied, stopping reading the register data.

3. The register reading method according to claim 2, wherein the method further comprises:
   according to importances of the registers in fault diagnosis, determining reading priorities of the plurality of registers, wherein the importances refer to importances of action scopes in a fault-diagnosis logic, application frequencies and application diagnosis logic branches in the whole fault-diagnosis logic of the registers; and
   according to the priorities of the registers, determining the time quantity of the reading of the register in the failing-polling region, wherein a reading time quantity of a register of a higher priority is not lower than a reading time quantity of a register of a lower priority.

4. The register reading method according to claim 1, wherein before the operation of, according to the register-reading mode, by using the PECI bus, reading the register data of the plurality of registers, the method further comprises:
   determining whether a previous CPU-register collecting request is completed; and
   when the previous CPU-register collecting request is completed, executing the operation of, according to the register-reading mode, by using the PECI bus, reading the register data of the plurality of registers.

5. The register reading method according to claim 1, wherein the method further comprises:
   counting up a quantity of successful reading and a quantity of failing reading of the plurality of registers, and recording a configuration situation of the server.

6. The register reading method according to claim 1, wherein the operation of, according to the predetermined condition, determining the register-reading mode comprises:
   according to the CPU type, determining the register-reading mode; or
   according to the reading success rates of the different reading modes, determining the register-reading mode; or
   according to mapping relations between the crashing scenes and the reading modes and the reading success rates, determining the register-reading mode.

7. The register reading method according to claim 1, wherein the method further comprises:
   by using level information of a CPU pin, determining whether the server is crashed.

8. The register reading method according to claim 7, wherein by using level information of a CPU pin, determining whether the server is crashed comprises:
   when the BMC detects that a magnitude of a level of the pin changes, determining the server is crashed.

9. An electronic device, wherein the electronic device comprises:
   a memory configured for storing a computer program; and
   a processor configured for, when executing the computer program, implementing the operations comprising:
   after a server is crashed, by a BMC, receiving a CPU-register collecting request;
   according to the CPU-register collecting request, determining a plurality of registers corresponding to a CPU type;
   according to a predetermined condition, determining a register-reading mode, wherein the register-reading mode includes a single-instruction mode, a sequence-instruction-sequence mode and a crash mode, the register-reading mode is also configurable to be automatically selected, and when the register-reading mode is configured to be automatically selected, the BMC counts up relations of crashing scenes with the register-reading modes and reading success rates of the crashing scenes, and selects, from the three register-reading modes, one register-reading mode that has a highest success rate for a current crashing scene and a current register for reading; and
   according to the register-reading mode, by using a PECI bus, reading register data of the plurality of registers, comprising:
   placing the plurality of registers into a to-be-read queue;
   reading one of the registers from the to-be-read queue, and according to the register-reading mode, by using the PECI bus, reading to-be-read register data of the register;
   when the reading of one of the registers from the to-be-read queue fails, placing the register into a queue tail of a failing-polling region;
   when the reading of one of the registers from the to-be-read queue succeeds, in response to the to-be-read queue being not empty, reading a next register in the to-be-read queue, or, in response to the to-be-read queue being empty, reading the register in the failing-polling region, and when the reading of the register in the failing-polling region fails, placing the register whose reading fails in the failing-polling region into the queue tail of the failing-polling region; and
   when the predetermined condition is reached, stopping the operation of the reading of the registers.

10. The electronic device according to claim 9, wherein the operations further comprise:
    setting a preset duration of a timer; and
    when any one of conditions that a reading duration reaches the preset duration, that all of the registers are completely read and that a time quantity of the reading of the register in the failing-polling region reaches a corresponding preset time quantity is satisfied, stopping reading the register data.

11. The electronic device according to claim 10, wherein the operations further comprise:
    according to importances of the registers in fault diagnosis, determining reading priorities of the plurality of registers, wherein the importances refer to importances of action scopes in a fault-diagnosis logic, application frequencies and application diagnosis logic branches in the whole fault-diagnosis logic of the registers; and
    according to the priorities of the registers, determining the time quantity of the reading of the register in the failing-polling region, wherein a reading time quantity of a register of a higher priority is not lower than a reading time quantity of a register of a lower priority.

12. The electronic device according to claim 9, wherein before the operation of, according to the register-reading mode, by using the PECI bus, reading the register data of the plurality of registers, the operations further comprise:
    determining whether a previous CPU-register collecting request is completed; and
    when the previous CPU-register collecting request is completed, executing the operation of, according to the register-reading mode, by using the PECI bus, reading the register data of the plurality of registers.

13. The electronic device according to claim 9, wherein the operations further comprise:
    counting up a quantity of successful reading and a quantity of failing reading of the plurality of registers, and recording a configuration situation of the server.

14. The electronic device according to claim 9, wherein the operation of, according to the predetermined condition, determining the register-reading mode comprises:
    according to the CPU type, determining the register-reading mode; or
    according to the reading success rates of the different reading modes, determining the register-reading mode; or
    according to mapping relations between the crashing scenes and the reading modes and the reading success rates, determining the register-reading mode.

15. A non-transitory computer-readable storage medium, wherein the computer-readable storage medium stores a computer program, and the computer program, when executed by a processor, implements the operations comprising:
    after a server is crashed, by a BMC, receiving a CPU-register collecting request;
    according to the CPU-register collecting request, determining a plurality of registers corresponding to a CPU type;
    according to a predetermined condition, determining a register-reading mode, wherein the register-reading mode includes a single-instruction mode, a sequence-instruction-sequence mode and a crash mode, the register-reading mode is also configurable to be automatically selected, and when the register-reading mode is configured to be automatically selected, the BMC counts up relations of crashing scenes with the register-reading modes and reading success rates of the crashing scenes, and selects, from the three register-reading modes, one register-reading mode that has a highest success rate for a current crashing scene and a current register for reading; and according to the register-reading mode, by using a PECI bus, reading register data of the plurality of registers, comprising:

placing the plurality of registers into a to-be-read queue;

reading one of the registers from the to-be-read queue, and according to the register-reading mode, by using the PECI bus, reading to-be-read register data of the register;

when the reading of one of the registers from the to-be-read queue fails, placing the register into a queue tail of a failing-polling region;

when the reading of one of the registers from the to-be-read queue succeeds, in response to the to-be-read queue being not empty, reading a next register in the to-be-read queue, or, in response to the to-be-read queue being empty, reading the register in the failing-polling region, and when the reading of the register in the failing-polling region fails, placing the register whose reading fails in the failing-polling region into the queue tail of the failing-polling region; and when the predetermined condition is reached, stopping the operation of the reading of the registers.

16. The register reading method according to claim 1, wherein the placing the plurality of registers into a to-be-read queue comprises:

based on a model and a core quantity of a CPU, whether a hyper-threading is turned on, and types and quantities of supported registers in configuration of the server detected by a BIOS, determining which registers are required to be read, and placing the registers into the to-be-read queue.

17. The non-transitory computer-readable storage medium according to claim 15, wherein the operations further comprise:

setting a preset duration of a timer; and when any one of conditions that a reading duration reaches the preset duration, that all of the registers are completely read and that a time quantity of the reading of the register in the failing-polling region reaches a corresponding preset time quantity is satisfied, stopping reading the register data.

18. The non-transitory computer-readable storage medium according to claim 17, wherein the operations further comprise:

according to importances of the registers in fault diagnosis, determining reading priorities of the plurality of registers, wherein the importances refer to importances of action scopes in a fault-diagnosis logic, application frequencies and application diagnosis logic branches in the whole fault-diagnosis logic of the registers; and according to the priorities of the registers, determining the time quantity of the reading of the register in the failing-polling region, wherein a reading time quantity of a register of a higher priority is not lower than a reading time quantity of a register of a lower priority.

19. The non-transitory computer-readable storage medium according to claim 15, wherein before the operation of, according to the register-reading mode, by using the PECI bus, reading the register data of the plurality of registers, the operations further comprise:

determining whether a previous CPU-register collecting request is completed; and when the previous CPU-register collecting request is completed, executing the operation of, according to the register-reading mode, by using the PECI bus, reading the register data of the plurality of registers.

20. The non-transitory computer-readable storage medium according to claim 15, wherein the operations further comprise:

counting up a quantity of successful reading and a quantity of failing reading of the plurality of registers, and recording a configuration situation of the server.

* * * * *